O. G. COSBY.
BEARING.
APPLICATION FILED JUNE 8, 1909.

959,469.

Patented May 31, 1910.

2 SHEETS—SHEET 1.

Witnesses
Frank B. Hoffman
D. W. Gould

Inventor
Oscar Garland Cosby
By Victor J. Evans
Attorney

O. G. COSBY.
BEARING.
APPLICATION FILED JUNE 8, 1909.

959,469.

Patented May 31, 1910.

2 SHEETS—SHEET 2.

Witnesses
Frank B. Hoffman
D. W. Gould

Inventor
Oscar Garland Cosby
By Victor J. Evans
Attorney

UNITED STATES PATENT OFFICE.

OSCAR GARLAND COSBY, OF HAMPTON, VIRGINIA, ASSIGNOR OF FORTY-NINE ONE-HUNDREDTHS TO FRANCIS F. CAUSEY, OF HAMPTON, VIRGINIA.

BEARING.

959,469.  Specification of Letters Patent.  Patented May 31, 1910.

Application filed June 8, 1909. Serial No. 500,819.

*To all whom it may concern:*

Be it known that I, OSCAR GARLAND COSBY, a citizen of the United States, residing at Hampton, in the county of Elizabeth City and State of Virginia, have invented new and useful Improvements in Bearings, of which the following is a specification.

The invention relates to an improvement in bearings for truck pivot plates, being more particularly directed to a self-oiling pivot bearing designed to carry a supply of lubricant and to automatically deliver the same to the bearing proper in sufficient quantities to maintain a proper lubrication.

The main object of the present invention is the provision of a pivot bearing in which one of the plates, preferably the female or truck plate, is provided with one or more reservoirs in open communication with the bearing proper, the wall of the latter being constructed to provide for a constant supply of lubricant under all running conditions of the bearing.

The invention will be described in the following specification, reference being had particularly to the accompanying drawings, in which :—

Figure 1:
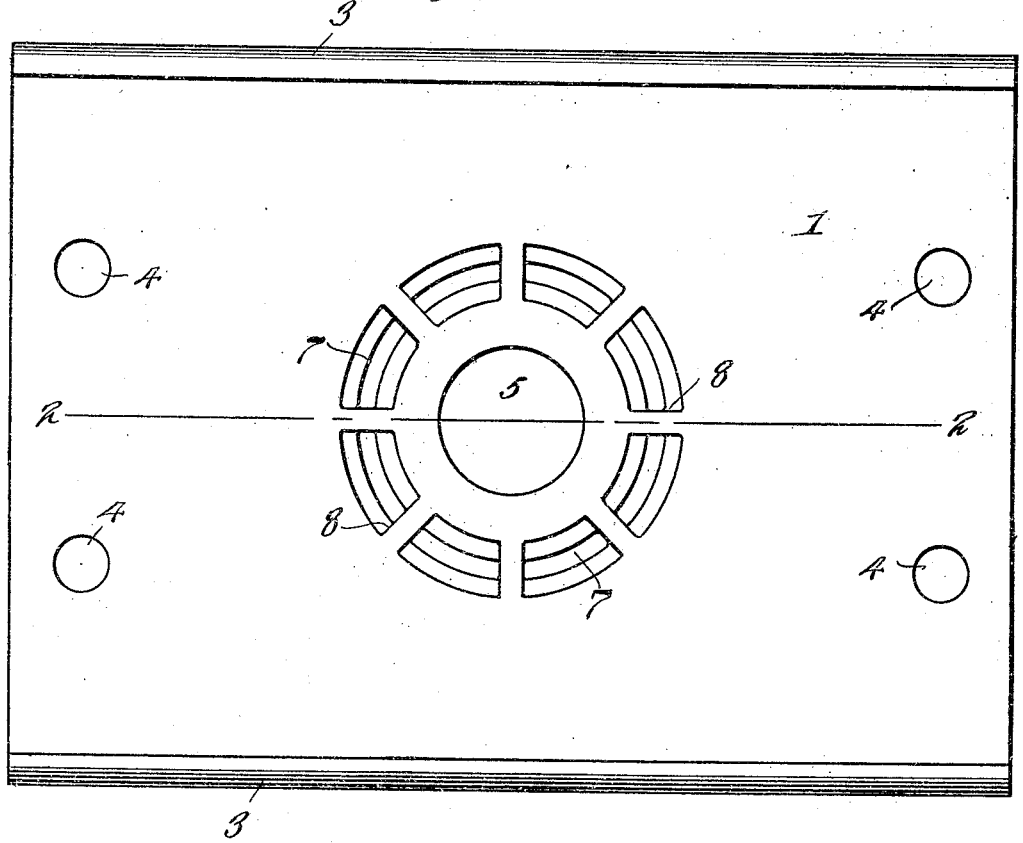
Figure 2:
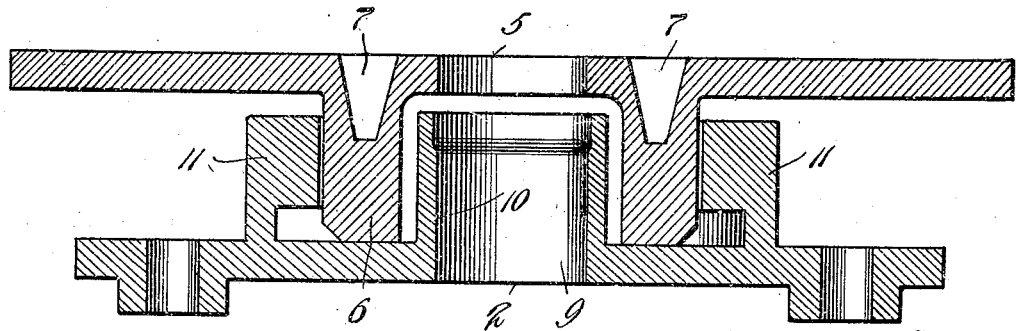
Figure 3:
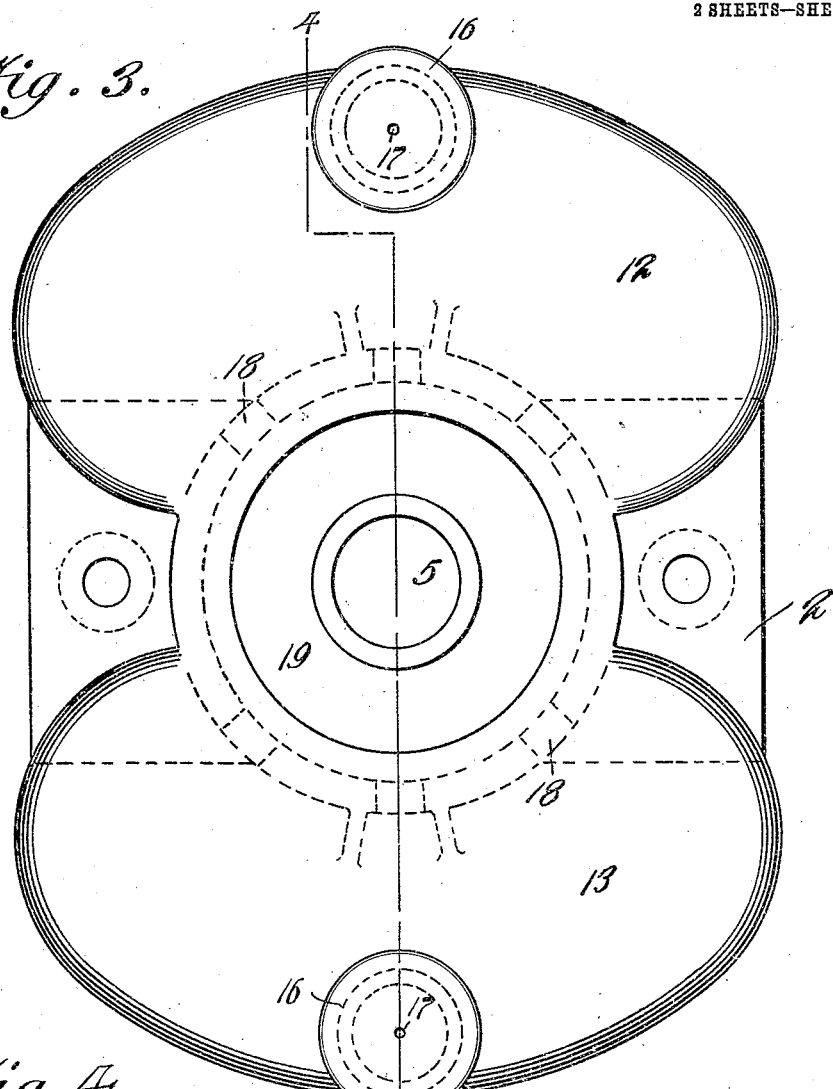
Figure 4:
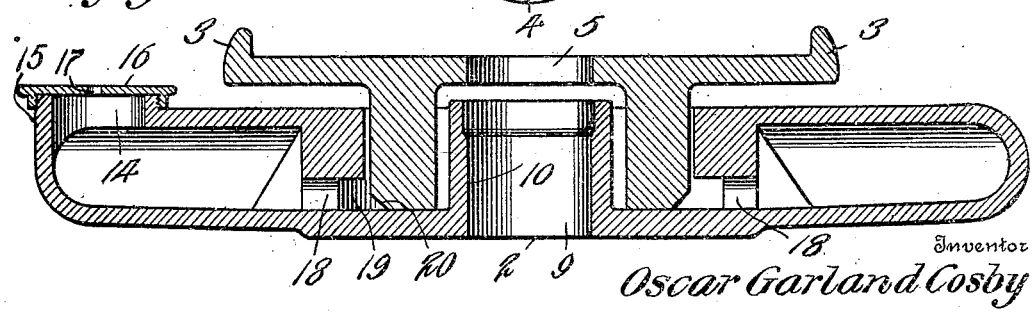

Figure 1 is a top plan of the upper or top plate of the bearing. Fig. 2 is a section through the bearing on line 2—2 of Fig. 1. Fig. 3 is a plan of the lower or truck plate of the bearing. Fig. 4 is a section through the bearing on line 4—4 of Fig. 3.

Referring particularly to the accompanying drawings the improved bearing comprises, as is usual in pivot bearings, an upper plate 1 designed for connection to the vehicle body and a lower plate 2 designed for connection to the truck. The upper plate 1 is substantially rectangular in form having upwardly extending side flanges 3 formed near each end or in otherwise appropriate positions with bolt openings 4 whereby the plate may be rigidly secured in place. The upper plate is centrally formed with an opening 5 and depending from the lower surface of the plate there is provided a bearing projection 6 having an interior diameter exceeding the diameter of the opening 5. The bearing projection is of annular formation arranged concentric with the opening 5, and that portion of the plate in alinement with the projection is preferably formed with an approximately V-shaped recess extending into the projection and bridged at determinate intervals with a series of radial webs 8. The lower or truck plate 2 is formed with a central opening 9 corresponding to the opening 5 in the upper plate and designed to aline therewith when the plates are in bearing relation. Coincident with the wall of the opening 9 the lower plate is provided with an upstanding wall 10, constituting the inner bearing wall and having an exterior diameter somewhat less than the interior diameter of the projection 6 of the upper plate. The lower plate is also provided concentric with the inner wall 10 with an outer bearing wall 11, having an interior diameter slightly greater than the exterior diameter of the bearing projection 6 of the upper plate, the outer bearing plate being preferably of greater thickness than the inner bearing plate.

Formed integral with the lower bearing plate 2 and arranged beyond the outer bearing wall 11 are what I term oil reservoirs 12 and 13, said reservoirs being preferably formed as integral castings with the lower bearing plate and utilizing the upper surface of said plate and an appropriate length of the outer bearing wall as a part of such reservoir. As shown more particularly in Fig. 4 the reservoirs thus constitute hollow compartments at each side of the bearing recess in the lower bearing plate, the upper surface of each reservoir being coincident with the upper edge of the outer wall 11. The reservoirs are closed except for a filling opening 14 preferably provided with a surrounding guard wall 15 appropriately constructed for the reception of a closing cap 16 having a vent 17.

The reservoirs are in communication with the bearing recess through conduits 18 formed in the outer bearing wall 11, the lower wall of the conduits being in coincidence with the upper surface of the bottom wall of the reservoir, and the bottom wall of each reservoir is further inclined downwardly from its relatively remote edge to the conduits, whereby all of the lubricant in the reservoir will tend to gravitate through the conduits during the lubrication of the bearing. The relatively inner surface of the outer bearing wall 11 is formed coincidently with the conduits 18 with an annular recess 19, forming in effect an undercut oil channel coextensive with the bearing recess and in open communication with the reservoirs through the conduits 18. The lower edge of the bearing projection 6 of the upper plate is beveled, as at 20, providing a directing face against which the oil is delivered in lubrication, and thereby preventing any unusual stirring of the lubricant or splashing of the same in the delivery of the oil to the rotating member and further providing for the cushioning of the back flow of the oil into the reservoir.

By reason of the interior height of the reservoirs being below the upper edge of the inner bearing wall an overflow of oil in the automatic lubrication of the bearings is absolutely prevented, this difference in height being also true of the outer bearing wall 11, though, as will be seen from Fig. 4 of the drawings, the upper edge of the inner bearing wall 10 is above the upper edge of the outer bearing wall 11.

In use it will be understood that the oil or other lubricant is automatically fed from the reservoirs to the oil channel 19 through the conduits 18 and thereby distributed to the bearings, maintaining at all times and under all conditions of operation a constant and perfect lubrication.

By reason of the inclined interior lower surface of the reservoirs as well as by the incline of the ducts or conduits there is a gravital pressure upon the body of oil from the reservoirs and through the conduits against the bearing at all times, thereby insuring a steady and even flow of the lubricant until the quantity of lubricant is entirely used. Owing to the disposition of the reservoirs and the normal height of the lubricant therein, it will be understood that by the natural law of liquid seeking its level there will be a constant supply of lubricant to the bearing so that the bearing parts are constantly immersed in a bath of lubricant. It will be further noted that the reservoirs as arranged do not take up any of the material of the casting of the lower plate, hence there is no weakening of this casting, but in fact a material strengthening of the same incident to the bracing of the outer bearing wall.

The reservoirs are disposed in diametric relation, that is in balancing position, and it will be noted are, through the bearing recess and conduits 18, in communication with each other as well as with the recess. As a result of this construction there is a perfect interflow and circulation of the lubricant between the reservoirs and the bearing, as well as between the bearing and reservoirs, hence rendering either an excessive or insufficient feed of the lubricant impossible, as by any undue tilting of the bearing the excess from one reservoir is immediately taken up by the other.

It is to be understood of course that the specific details of the bearing plates herein described are intended to illustrate a conditional and conventional form only of such structure, and that it is contemplated that the specific details of novelty whereby the automatic and balance lubrication of the bearing is secured are applicable to any form of pivot bearing.

Having thus described the invention what is claimed as new, is:—

1. The combination with a pivot bearing, of a plurality of reservoirs in open communication therewith and with each other through the bearing.

2. The combination with a pivot bearing, of a plurality of reservoirs in open communication therewith and with each other through the bearing, said reservoirs being formed for a gravity feed.

3. The combination with a pivot bearing, of a plurality of reservoirs in open communication therewith, the upper edges of the female portion of the bearing being above the possible height of lubricant in the reservoirs.

4. The combination with a pivot bearing, of a plurality of reservoirs in open communication with the lower portion of the bearing, the upper edges of the oil confining space of the bearing being above the possible height of lubricant in the reservoirs.

5. The combination with a pivot bearing having the female portion formed with an oil channel encircling and in communication with the bearing recess, and a reservoir in open communication with said channel.

6. The combination with a pivot bearing, of a reservoir in open communication therewith, the male portion of the bearing having a beveled edge in alinement with the communication between the bearing recess and the reservoir, the female portion of the bearing being formed with an annular oil channel in open communication with the reservoir and opposite said beveled edge.

7. The combination of a pivot bearing with reservoirs internally communicating therewith, said reservoirs being integral with and substantially exterior to the bearing plate and in open communication with each other.

8. The combination with a pivot bearing, of reservoirs whose interior bottoms incline continuously downwardly and inwardly from the outer extremities toward the bearing, each of said reservoirs being in communication with the bearing by a plurality of ducts running parallel with the interior bottoms of the reservoirs.

In testimony whereof I affix my signature in presence of two witnesses.

OSCAR GARLAND COSBY.

Witnesses:
J. H. SMITH,
GUY A. HOWARD.